United States Patent
Davies

(10) Patent No.: US 10,225,516 B2
(45) Date of Patent: Mar. 5, 2019

(54) LATENCY MITIGATION THROUGH INTELLIGENT EXTRAPOLATION IN MULTIMEDIA SYSTEMS

(71) Applicant: Cisco Technology, Inc., San Jose, CA (US)

(72) Inventor: Thomas Davies, Guildford (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/631,264

(22) Filed: Jun. 23, 2017

(65) Prior Publication Data

US 2018/0376105 A1    Dec. 27, 2018

(51) Int. Cl.
    *H04N 7/14* (2006.01)
    *H04N 21/434* (2011.01)
    *H04L 29/06* (2006.01)
    *G06F 3/0484* (2013.01)

(52) U.S. Cl.
    CPC ......... *H04N 7/147* (2013.01); *G06F 3/04842* (2013.01); *H04L 65/60* (2013.01); *H04N 21/4341* (2013.01)

(58) Field of Classification Search
    USPC ....................................................... 348/14.01
    See application file for complete search history.

(56) References Cited

U.S. PATENT DOCUMENTS

| | | | |
|---|---|---|---|
| 7,433,490 B2 | 10/2008 | Huang et al. | |
| 7,499,104 B2 | 3/2009 | Cooper | |
| 7,636,662 B2 | 12/2009 | Dimtrova et al. | |
| 9,124,771 B2* | 9/2015 | Zou | H04N 7/1675 |
| 9,258,525 B2 | 2/2016 | Matthews | |
| 9,277,214 B2 | 3/2016 | Davies | |
| 9,832,507 B2* | 11/2017 | Le Nerriec | H04N 21/4104 |
| 2010/0188967 A1* | 7/2010 | Michaelis | H04L 1/22 370/216 |
| 2012/0207225 A1* | 8/2012 | Jeong | H04N 21/2343 375/240.25 |
| 2014/0376873 A1 | 12/2014 | Tanaka et al. | |
| 2016/0043957 A1* | 2/2016 | Mendez | H04L 65/605 370/252 |

* cited by examiner

*Primary Examiner* — Quoc D Tran
(74) *Attorney, Agent, or Firm* — Parker Ibrahim & Berg LLP; James M. Behmke; Stephen D. LeBarron

(57) ABSTRACT

In one embodiment, a device de-multiplexes a stream of multimedia data into first and second media streams. The device determines that a portion of the first media stream is missing for co-presentation with a corresponding portion of the second media stream due to a present latency condition. The device associates the corresponding portion of the second media stream with a previously received portion of the second media stream. The device generates media data for the first media stream for co-presentation with the corresponding portion of the second media stream in lieu of the missing portion of the first media stream, based on a previously received portion of the first media stream associated with the previously received portion of the second media stream. The device provides the generated media data and the corresponding portion of the second media stream for co-presentation by one or more user interfaces.

14 Claims, 8 Drawing Sheets

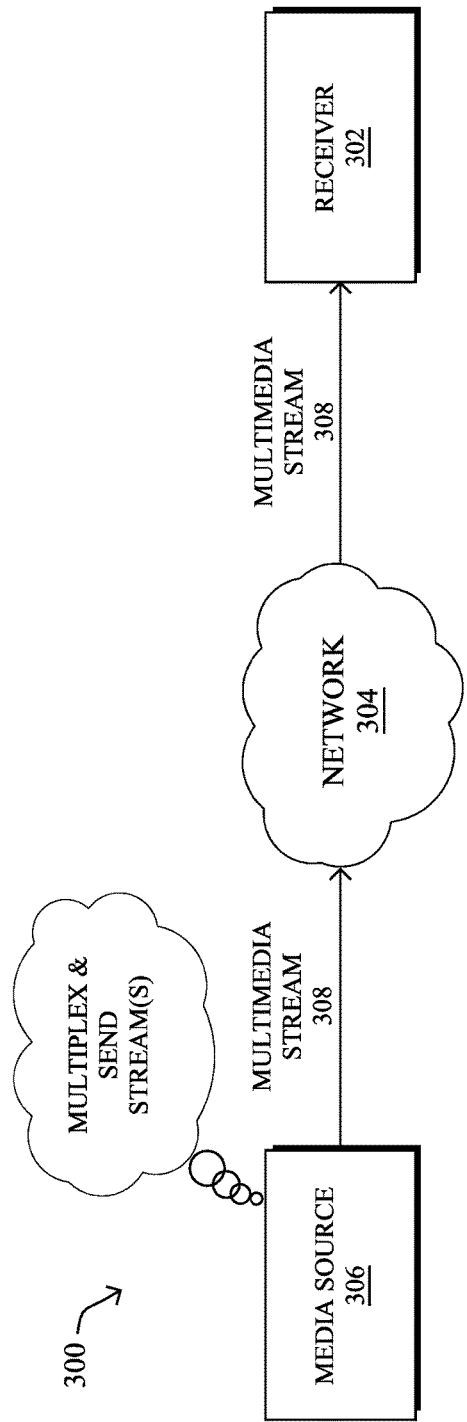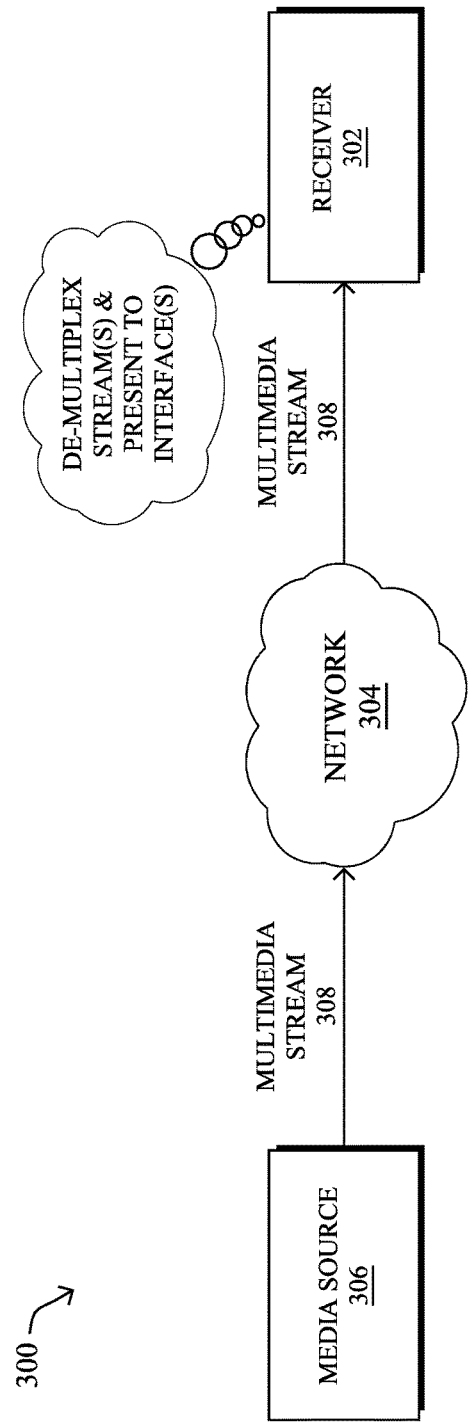

LATENCY MITIGATION THROUGH INTELLIGENT EXTRAPOLATION IN MULTIMEDIA SYSTEMS

TECHNICAL FIELD

The present disclosure relates generally to computer networks, and, more particularly, to latency mitigation through intelligent extrapolation in multimedia systems.

BACKGROUND

It is common in conferencing systems today to have multiple streams with varying delay requirements traversing the same paths. For example, consider the use case of a video conferencing presentation. In such a case, there may be at least three different media streams: the actual presentation stream (e.g., presentation slides), a video stream (e.g., a webcam feed of the presenter), and an associated audio stream (e.g., the captured voice of the presenter).

Different types of media may have different delay requirements. For example, audio and video streams may have much tighter delay requirements than that of a slide presentation stream. Notably, a conferencing participant may not even notice a slight delay in the presentation stream. However, the video and audio streams may have much tighter delay requirements than the corresponding slide presentation stream. Furthermore, even with the video and audio for the same visual session, the audio data may have a tighter delay constraint than the associated video stream. For example, displaying a video frame slightly late may be imperceptible to the user, while a gap in the audio of a speaker can be highly distracting.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3B illustrates an example of devices streaming multimedia data;

DESCRIPTION OF EXAMPLE EMBODIMENTS

Overview

Figure 1A:
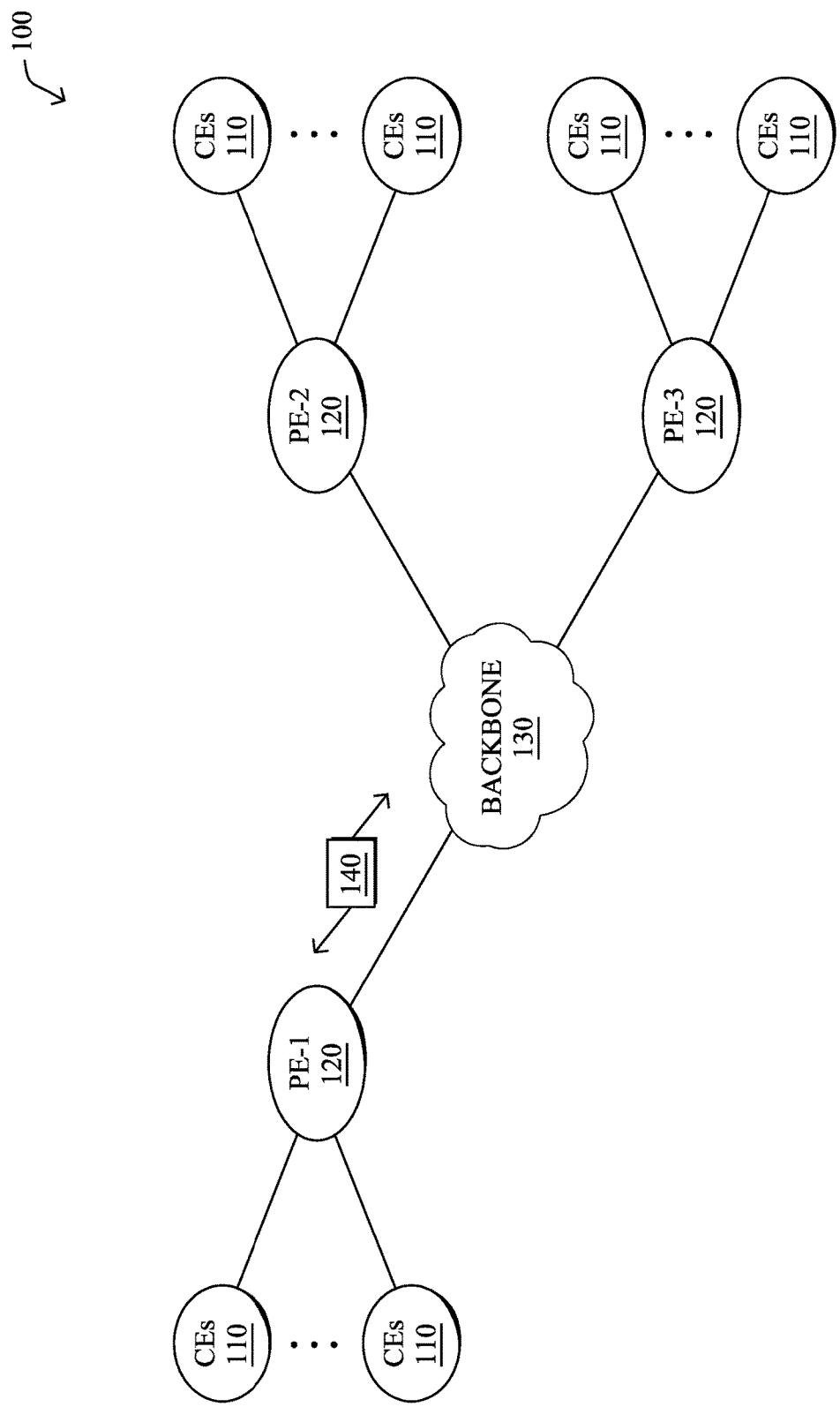
FIGS. 1A-1B illustrate examples of a communication network.

According to one or more embodiments of the disclosure, a device de-multiplexes a stream of multimedia data into first and second media streams. The device determines that a portion of the first media stream is missing for co-presentation with a corresponding portion of the second media stream due to a present latency condition. The device associates the corresponding portion of the second media stream with a previously received portion of the second media stream. The device generates media data for the first media stream for co-presentation with the corresponding portion of the second media stream in lieu of the missing portion of the first media stream, based on a previously received portion of the first media stream associated with the previously received portion of the second media stream. The device provides the generated media data and the corresponding portion of the second media stream for co-presentation by one or more user interfaces.

Example Embodiments

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
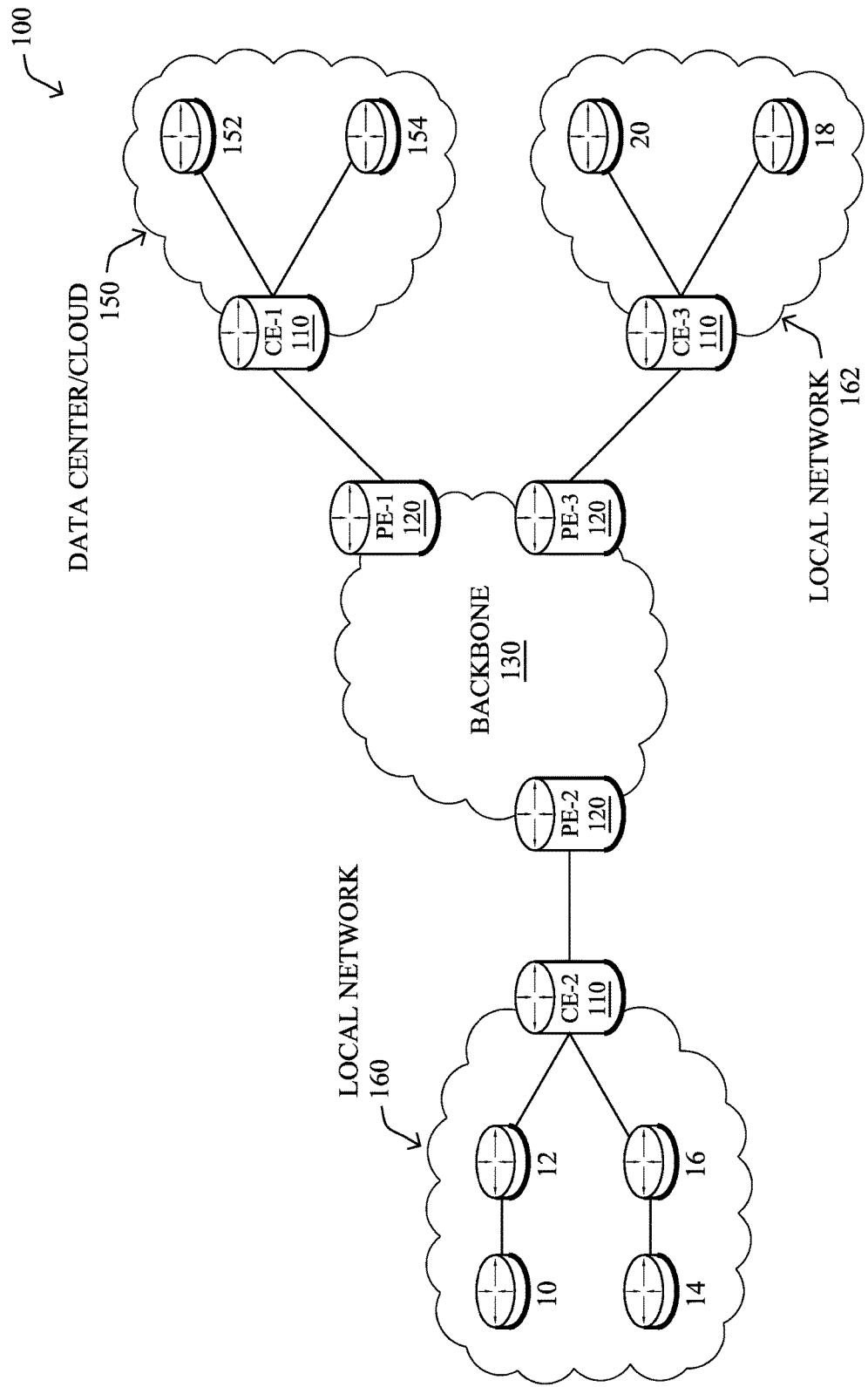

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, a media server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Figure 2:
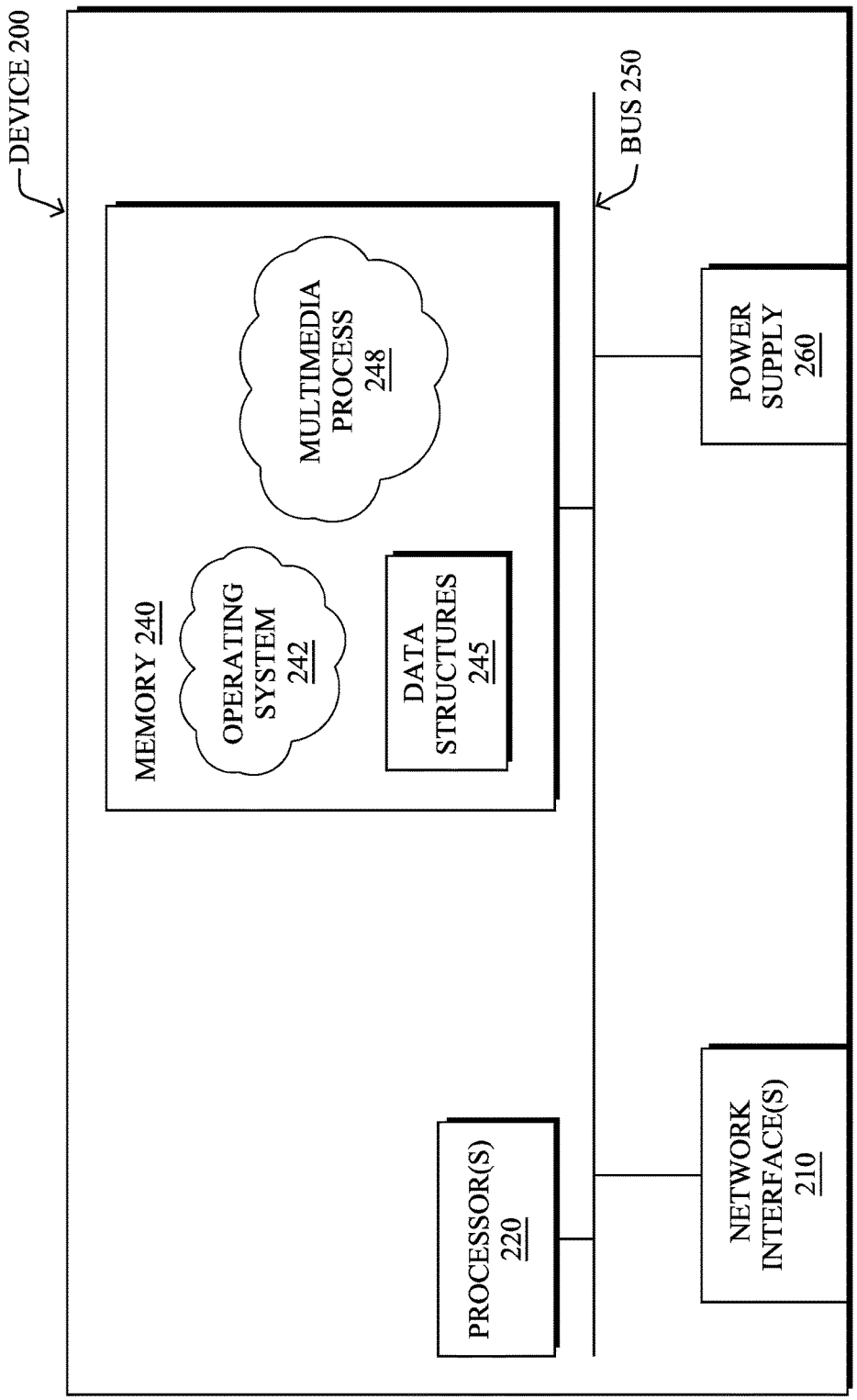
FIG. 2 illustrates an example network device/node.

FIG. 2 is a schematic block diagram of an example node/device 200 that may be used with one or more embodiments described herein, e.g., as any of the nodes shown in FIG. 1 above or described in greater detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data to and from a network, such as local network 160, backbone network 130, etc. The network interfaces may be configured to transmit and/or receive data using a variety of different communication protocols. Note, further, that the nodes/devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which is typically resident in memory 240 and executed by the processor, functionally organizes the device by, inter alia, invoking operations in support of software processes and/or services executing on the device. These software processes and/or services may include multimedia process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

FIGS. 3A-3B illustrates an example of devices streaming multimedia data using, e.g., a communication network, such as that shown in FIGS. 1A-1B. As shown in FIG. 3A, a receiver device 302 may be in communication with a media source device 306 via one or more computer networks 304. Media source device 306 provides multimedia stream packets 308 through network(s) 104 to receiver device 302. As will be appreciated, network(s) 304 may include, but are not limited to, local area networks (LANs), wide area networks (WANs), the Internet, cellular networks, infrared networks, satellite networks, or any other form of data network configured to convey data between computing devices, as detailed above.

In general, multimedia stream packets 308 may include a plurality of different media streams intended for co-presentation by one or more user interfaces of receiver device 302. For example, multimedia stream packets 308 may include at least one audio stream and one video stream, multiple audio streams, multiple video streams, etc. Notably, in the case of videoconferencing, multimedia stream packets 308 may include both a video stream of a conference participant, as well as an audio stream of the participant's voice, both of which are to be provided in conjunction with one another on the one or more user interfaces of receiver device 302 (e.g., an electronic display, one or more speakers, etc.).

In some cases, media source device 308 may send multimedia stream packets 308 directly to receiver device 302 via network 304. However, in further cases, packets 308 may also be sent indirectly to receiver device 302, such as through one or more intermediary relay nodes in network 304. For example, a media relay node may be part of a cloud-based or datacenter-based service, such as a conferencing service. Typically, relay nodes are used in cases in which there are multiple media sources, such as when there are multiple participants in a videoconference. In turn, the relay node may combine and/or select the media streams that are to be sent on to the receiving devices.

Multimedia source device 306 may multiplex and send multimedia stream packets 308 using any known transmission and encoding technique. In low delay applications, audio and video media packets may be output as fast as possible to reduce latency, and may take different routes to the receiver and experience different delays. In other applications, encapsulation formats may be used so that co-timed audio and video information are always transmitted and received together. One example encoding technique is forward error correction (FEC), which attempts to protect network communications from errors and losses/erasures. In particular, FEC allows a sender to encode a communication in such a way that if portions/packets of the communication are lost during transmission, the receiver is still able to reconstruct the original message. FEC is often used in the context of video conferencing or multimedia streaming, due to the timing constraints involved. For example, the delay requirements of media streams are often such that it would be impossible for the receiver to request retransmission of a lost packet, while still presenting the lost data to the user in time. Alternatively, a mechanism such as Automatic Repeat-reQuest (ARQ) can be used by receiver device 302 to request missing packets or packets received with errors from multimedia source device 306.

As shown in FIG. 3B, once receiver device 302 receives the multimedia stream packets 308, it may de-multiplex the packets back into their original streams for co-presentation by its user interfaces. For example, receiver device 302 may de-multiplex an audio stream from packets 308 and send the audio data to one or more of its speakers. Similarly, receiver device 302 may de-multiplex a video stream from packets 308 and send the video data to its electronic display. If not encapsulated together, audio and video streams may experience different delays and different variation in delay. Typically, also, audio data corresponding to a unit of time are of a constant size and video data corresponding to a unit of time (such as a frame period) are variable in size, implying an equally variable time to deliver and a consequent delay.

As noted above, latency conditions present in network 304 (and/or internal to devices 302, 306) may impact the user experience of the user operating receiving device 306. In particular, when multiple media streams are to be co-presented with one another, any delay in the delivery of any of the streams to the user interfaces may be noticed by the user. Network conditions that may lead to the presence of latency may include, for example, traffic congestion, reroutes, malfunctioning routers or switches, full buffers, and the like. There are also no guarantees that all media streams carried via multimedia stream packets 308 will travel the same network path within network 104.

Certain types of media may be more tolerant of latency than others, from a user perspective. For example, displaying an individual video frame slightly late may be imperceptible to the user, while a gap in the audio of a speaker can be highly distracting to the user. Thus, the threshold latency or jitter tolerance in an audio stream before affecting the user experience may be considerably lower than the threshold latency in a video stream before affecting the user experience. At the same time, the latency of both are coupled together by the need to maintain lipsync. As codecs improve, although average bitrates go down, rates for easy video frames go down more than those for hard ones, leading to "lumpy" video streams that require more buffering and more delay to attain the average bit rate savings.

Latency Mitigation Through Intelligent Extrapolation in Multimedia Systems

The techniques herein allow for the effects of latency to be mitigated in multimedia systems through the use of intelligent extrapolation. In various aspects, the techniques herein may leverage language processing, speech recognition, facial and motion modeling, and/or other media analysis mechanisms, to create robust single-channel and cross-channel models and predictions. By exploiting extensive history within media streams and cross-correlating between different media streams, such as between audio and video streams, these models can be rapidly trained and adapted.

Specifically, according to one or more embodiments of the disclosure as described in detail below, a device de-multiplexes a stream of multimedia data into first and second media streams. The device determines that a portion of the first media stream is missing for co-presentation with a corresponding portion of the second media stream due to a present latency condition. The device associates the corresponding portion of the second media stream with a previously received portion of the second media stream. The device generates media data for the first media stream for co-presentation with the corresponding portion of the second media stream in lieu of the missing portion of the first media stream, based on a previously received portion of the first media stream associated with the previously received portion of the second media stream. The device provides the generated media data and the corresponding portion of the second media stream for co-presentation by one or more user interfaces.

Illustratively, the techniques described herein may be performed by hardware, software, and/or firmware, such as in accordance with the multimedia process 248, which may include computer executable instructions executed by the processor 220 (or independent processor of interfaces 210) to perform functions relating to the techniques described herein.

Figure 4:
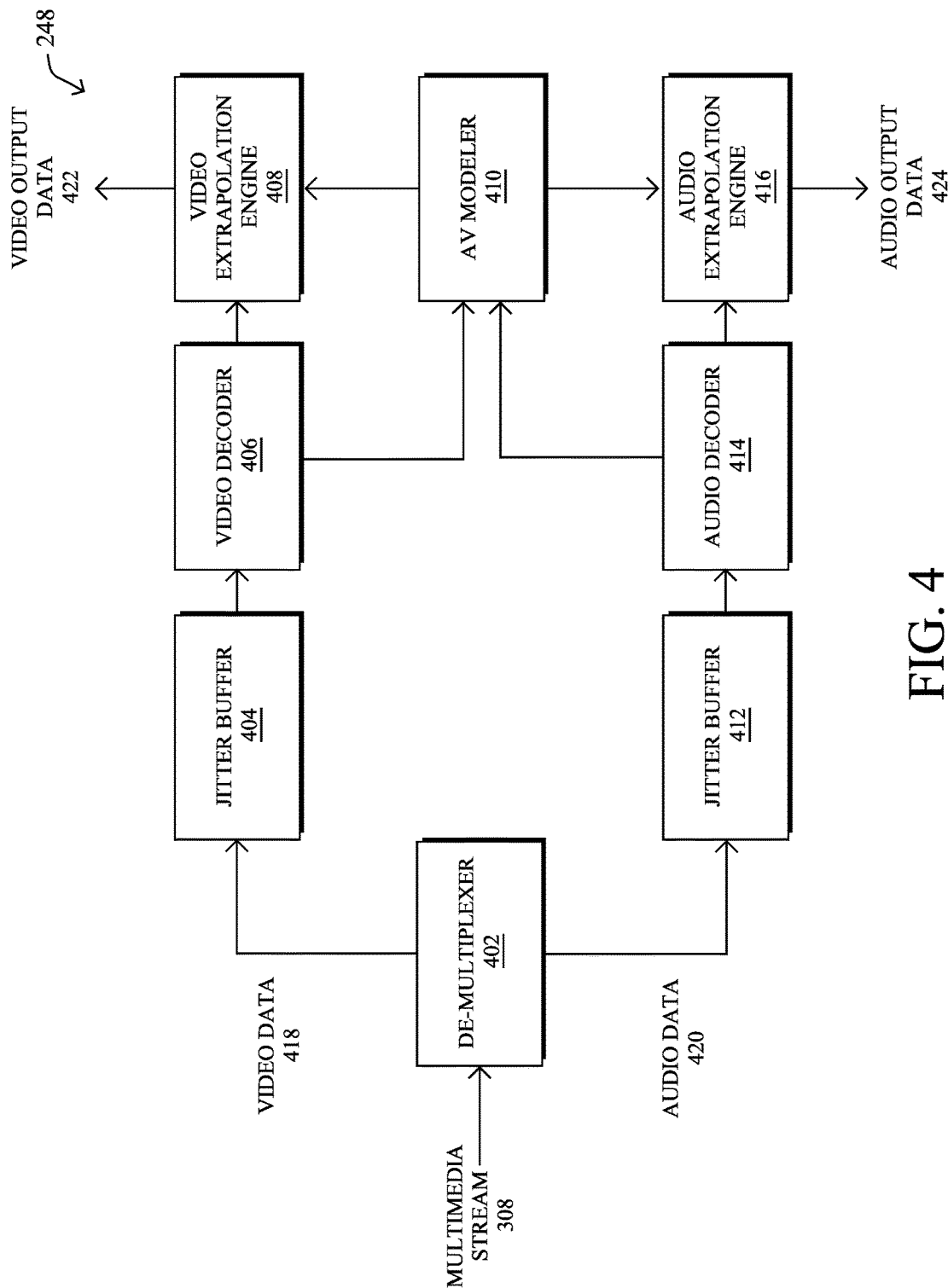
FIG. 4 illustrates an example architecture for processing received multimedia data.

Operationally, FIG. 4 illustrates an example architecture for processing received multimedia data, e.g., as part of multimedia process 248. As shown, multimedia process 248 may include a number of sub-processes 402-416 that may be combined, omitted, or included in other sub-processes, as desired. Further, while sub-processes 402-416 are depicted as executing on a single receiver device, or hardware component thereof, other implementations provide for these sub-processes to be implemented in a distributed manner. Additionally, while the architecture is shown with respect to processing multimedia streams comprising an audio stream and a video stream, further embodiments provide for the techniques described herein to be applied to any form of multiplexed media streams (e.g., multiple audio streams, multiple video streams, etc.), in a similar manner.

During execution, de-multiplexer 402 may receive multimedia stream packets 308 and distinguish between the different media streams present in the multiplexed stream. For example, de-multiplexer 402 may distinguish between video data 418 and audio data 420 that may be present in the incoming multimedia stream from the network. De-multiplexer 402 may also apply the appropriate mechanism to the incoming multimedia stream, to separate out the individual media streams.

Multimedia process 248 may process the data of each individual media stream, separately. For example, multimedia process 248 may pass video data 418 to a jitter buffer 404 and audio data 420 to a jitter buffer 412. Each of jitter buffers 404, 412 may accumulate their corresponding video or audio packets, so that a complete set of packets for a video frame or audio time period can be provided to the appropriate decoder (e.g., video decoder 406 and audio decoder 414). Doing so ensures that a continuous stream of media is provided to the user interface(s) of the executing device. This is necessary as the packets of video data 418 and audio data 420 may have an uneven distribution when received, even if transmitted at exactly regular intervals, which is typically not the case. In other words, jitter buffers 404, 412 may operate to help ensure that the outputs of decoders 406, 414 maintain a constant rate.

Decoders 406 and 414 may apply the appropriate decoding to their respective streams, according to the encoding mechanism used by the source of the incoming multimedia stream. For example, decoders 406 and 414 may apply a decompression mechanism (e.g., H.264 video decompression, G.711 audio decompression, etc.), to reconstruct the separate packets of video data 418 and audio data 420, respectively, into playable media.

To ensure that portions of the video stream and audio stream are co-presented by the user interface(s) at the appropriate time, multimedia process 248 may simply use a delay mechanism when a latency condition is detected. For example, assume that there is a delay in the audio output of audio decoder 414 of 0.5 seconds, due to network latency. In such a case, one way to ensure that the audio presented to the user remains in synchronization with the corresponding video presented to the user would be to enforce a delay of 0.5 seconds to the video, as well. However, this approach would cause both streams to be delayed during output (e.g., video and audio output data 422-424 sent to their respective user interfaces for co-presentation), meaning that the delay will still be perceivable to the end user.

In practice, jitter buffers 404, 412 can also be placed after the decoders 406, 414, and combined with the synchronization process, so that decoders 406, 414 operate asynchronously and delays are imposed subsequently. In doing so, delays can be applied both to achieve a constant output rate of the two streams, as well as synchronization across the two streams. This is especially advantageous in software where the decoding process itself may impose variable delay.

In further embodiments, rather than employ a simple delay mechanism to synchronize the different media streams, multimedia process 248 may instead use extrapolation, to mitigate the effects of latency. From a high level, this entails extrapolating from current and previous portion of the media streams, to generate media for presentation by the user interface(s) in the future, when the media is not otherwise available, such as due to a latency condition being present. In the case of AV multimedia, there may be two parts to this extrapolation:

1.) Audio extrapolation by audio extrapolation engine 416 based on prior AV data, making use of techniques such as speech recognition and modelling to predict future words and phonemes. In some embodiments, audio extrapolation engine 416 may also make use of video analysis to enhance the prediction, especially if the portion of the video stream is ahead of the corresponding portion of the audio stream.

2.) Video extrapolation by video extrapolation engine 408 based on prior AV data, making use of prior video data, and modelling techniques such as motion modelling and compensation, feature extraction, head and shoulder modelling, and/or the like. Video extrapolation engine 408 may also make use of audio analysis to enhance the prediction, especially if the portion of the audio stream is ahead of the corresponding portion of the video stream.

Both extrapolation engines 408, 416 can, in effect, apply a "negative delay" to either media channel or even to both channels. In both cases, information is available within the same channel (audio or video), but cross-channel information can also be exploited by a cross-channel AV modeler 410. In general, cross-channel AV modeler 410 may model and identify relationships between the various portions of the audio and video streams. This can allow the audio stream to be extrapolated forward in time to align with video timestamps, or vice-versa. In addition, both the audio and video streams could be aligned together and moved forward in time, to reduce latency in both channels.

In various embodiments, video extrapolation engine 408, audio extrapolation engine 416, and/or AV modeler 410 may utilize machine learning, to generate media for co-presentation in lieu of a portion of a media stream corresponding to a current, or more recent, or even a future time, that is missing due to a latency condition. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Multimedia process 248 may employ supervised, unsupervised, or semi-supervised machine learning models, according to various implementations. Generally, supervised learning entails the use of a training set of data, as noted above, that is used to train the model to apply labels to the input data. For example, the training data may include sample audio that should be played in conjunction with a sample portion of video or vice-versa. It may also include prior data of the same type: for example, prior samples of audio or video for each audio or video sample. On the other end of the spectrum are unsupervised techniques that do not require a training set of labels. Notably, while a supervised learning model may look for previously seen patterns that have been labeled as such, an unsupervised model may instead look to whether there are hidden relationships between the different portions of the media streams. Semi-supervised learning models take a middle ground approach that uses a greatly reduced set of labeled training data.

Example machine learning techniques that multimedia process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like. Note that machine learning techniques may be applied directly to form predictions for multimedia data, but may also make use of predictions or features derived from other media or signal processing approaches, for example motion-compensated prediction in the case of video, or linear predictive modelling in the case of audio.

The performance of a machine learning model can be evaluated in a number of ways based on the number of true positives, false positives, true negatives, and/or false negatives of the model. For example, the false positives of the model may refer to the number of times the model incorrectly applied a certain label to a given portion of a media stream (e.g., by identifying the wrong audio for a corresponding portion of video, etc.). Conversely, the false negatives of the model may refer to the number of times the model should have correctly applied that label, but did not. True negatives and positives may refer to the number of times the model correctly did not apply the label or did apply the label, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. Reinforcement learning can also be used with the techniques herein, so as to reduce the number of false positives, false negatives, etc., using feedback.

Note that multimedia process 248 may selectively apply the extrapolations from extrapolation engines 408, 416, according to one or more latency thresholds. For example, if multimedia process 248 determines that a latency condition is affecting the audio stream, it may signal audio extrapolation engine 416 to begin generating audio that corresponds to the portion of video that is to be presented to the user interface. However, if the audio latency is below a predefined threshold, multimedia process 248 may instead provide the audio from the audio stream for co-presentation with the corresponding portion of the video stream. A similar approach may be taken with respect to latency in the video stream. In addition, the latency thresholds that trigger the extrapolations may differ based on the different media types (e.g., the latency threshold for the audio stream may be lower than the latency threshold for the video stream).

Figure 5:
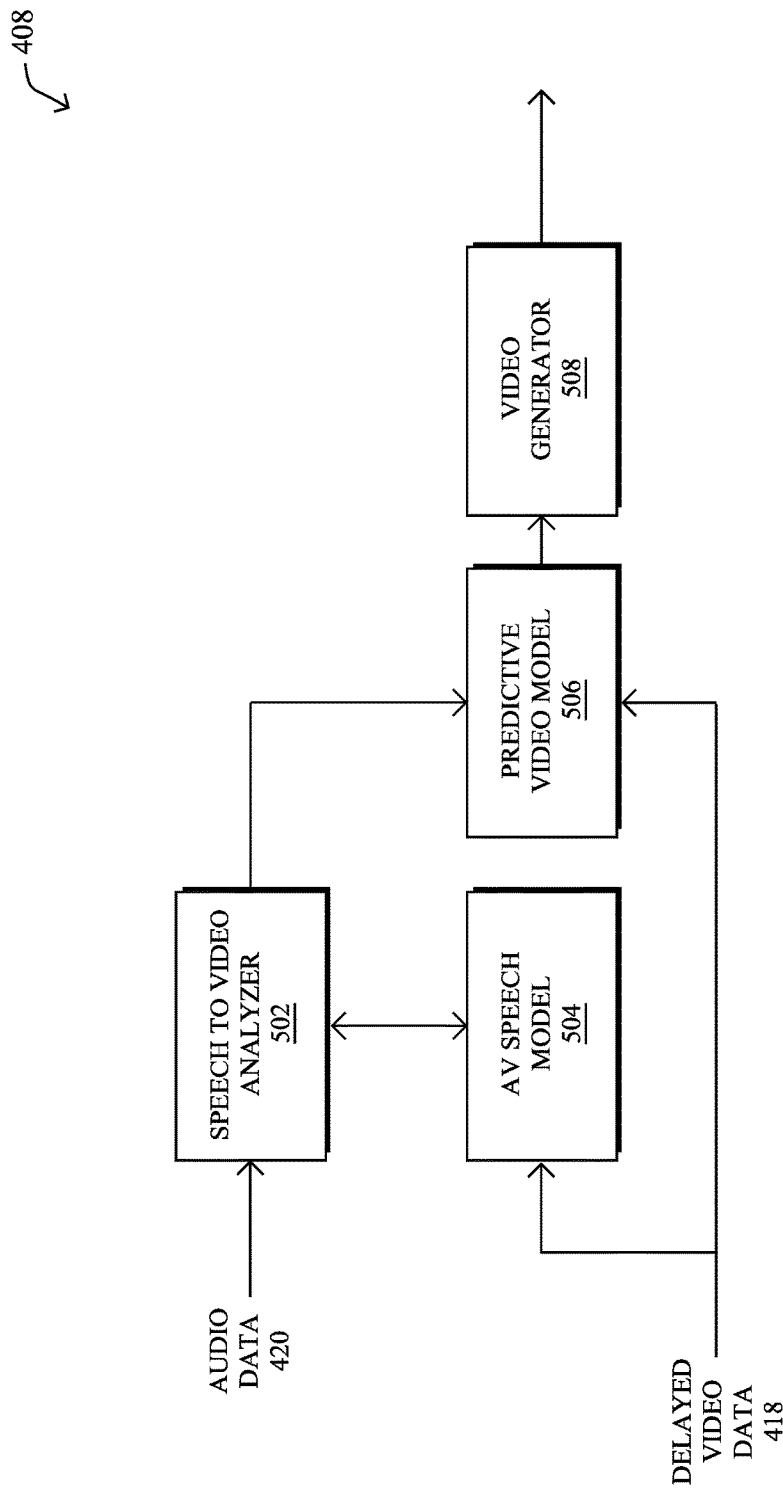
FIG. 5 illustrates an example architecture for generating video under latency conditions.

FIG. 5 illustrates an example architecture for generating video under latency conditions, according to various embodiments. In general, video extrapolation engine 408 may itself include any or all of the sub-processes 502-508 shown that are operable to generate video in the presence of latency in the video stream.

As shown, consider the case in which latency is causing a delay in video data 418, but is not causing a similar delay in audio data 420. In such a case, a portion of audio data 420 may be ready for co-presentation (e.g., a spoken word or sentence, phoneme, a sound, etc.), but its corresponding portion of video data 418 may be missing, due to the latency. Through analysis of the portion of audio, as well as the history of video data 418, video extrapolation engine 408 can generate media data that can be used in lieu of the missing portion of video.

At the core of video extrapolation engine 408 may be an AV speech model 504 (e.g., as generated by AV modeler 410) that relates portions of the audio stream and portions of the video stream. For example, assume that the word "sales" was uttered multiple times previously by a conference participant in the audio stream and that the current portion of audio data 420 also includes this word. In such a case, speech to video analyzer 502 may identify those prior portions of the audio stream and use AV speech model 504 to identify the corresponding portions of the video stream that were co-presented (e.g., displayed) when "sales" was presented by one or more speakers of the device to the user.

Based on the portions of the video stream that are associated with the same or similar audio as in the current portion of the audio stream (e.g., co-presented with the audio, used to extrapolate video that was co-presented with the audio, etc.), speech to video analyzer 502 may train a predictive video model 506 to identify the common video features across those portions of video. In some cases, the video features may be on a pixel by pixel basis or for different regions of the portion of video. More complicated approaches may also leverage image recognition, to identify specific features, such as facial features of a conference participant that uttered the audio in the audio stream. For example, predictive video model 506 may model the mouth movements of the conference participant when uttering the word "sales" at different points throughout the audio stream. As would be appreciated, predictive video model 506 may become more able to predict the corresponding portion of the video stream for a given portion of the audio stream, with more data points becoming available over time.

Based on the identified video features from predictive video model 506, video extrapolation engine 408 may then execute a video generator 508 to generate the video for output to the display and co-presentation with the portion of the audio stream under analysis. In some cases, video generator 508 may simply present a previously displayed portion of the video (e.g., a previously displayed portion of the video in which the participant uttered "sales").

In further embodiments, however, video generator 508 may combine the video features from predictive video model 506 with the most recently displayed portion of the video stream, to form a hybrid portion of video. Such an approach may, for example, extrapolate the most currently displayed video to take into account motion, changes in the background, etc. In another example, such as when the video feature is a specific facial feature (e.g., a mouth movement, etc.), video generator 508 may blend this feature into the most recently displayed portion of video. Thus, based on the previous movements of the participant's mouth when uttering "sales," video generator 508 can output a portion of video that approximates the next portion of video in the video sequence such that the mouth of the represented participant in the video also moves in a similar manner. As would be appreciated, this is but one example and the techniques herein are not limited to simply mouth movement synthesis and could be used to even identify and incorporate subtle video features that would not otherwise be discernable (e.g., a slight tilt of the participant's head, blinking patterns, etc., when uttering a specific word, etc.).

Figure 6:
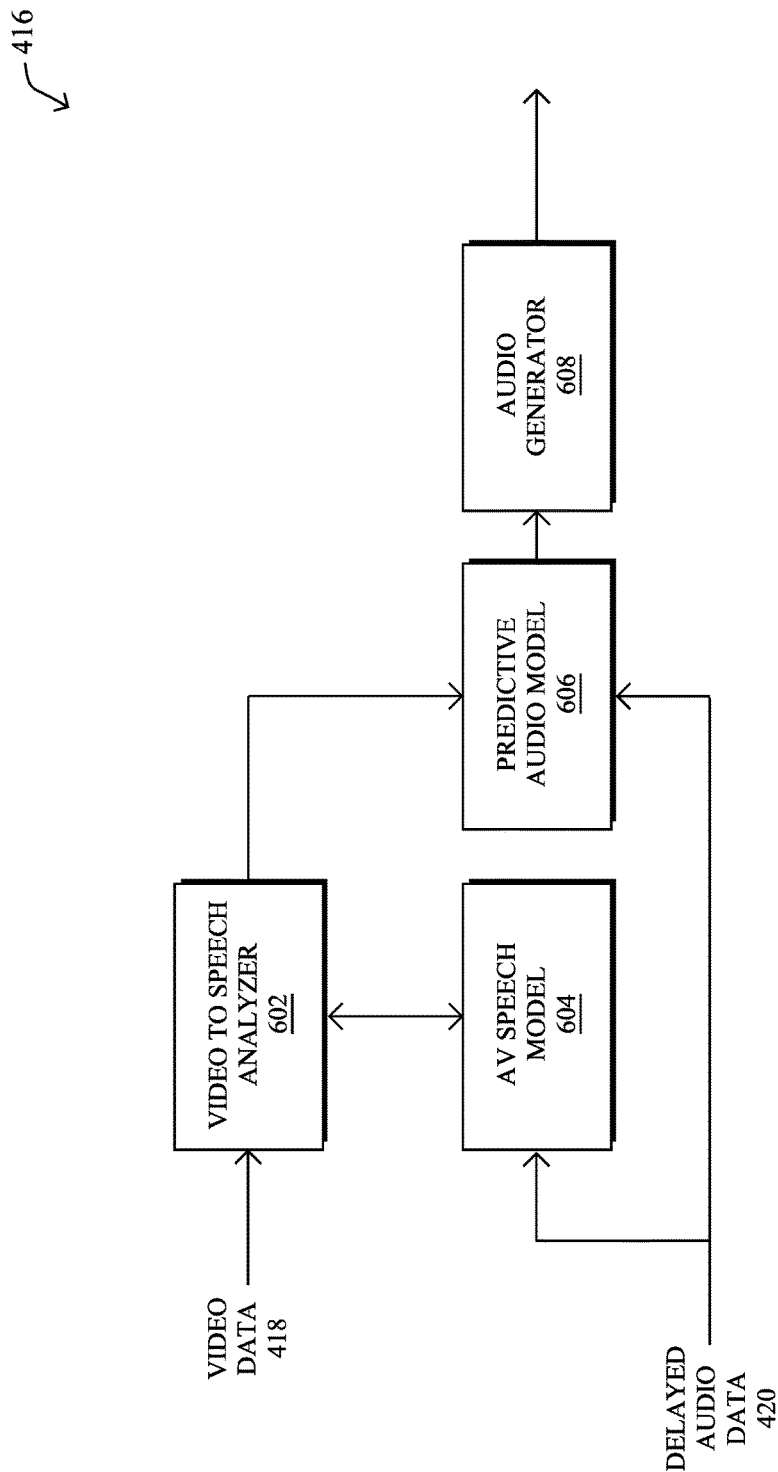
FIG. 6 illustrates an example architecture for generating audio under latency conditions.

FIG. 6 illustrates an example architecture for generating audio under latency conditions, according to various embodiments. In general, audio extrapolation engine 416 may employ a similar architecture as that of video extrapolation engine 408, to extrapolate the audio stream and generate audio that can be used in lieu of missing portions of the audio stream. For example, consider the opposite case of FIG. 5, whereby video data 418 is now on time, but audio data 420 is delayed due to the presence of a latency condition. In such a case, audio extrapolation engine 416 may employ the sub-processes 602-608 shown, to generate audio for co-presentation with the corresponding portion of the video stream by the user interfaces of the device.

As shown, video to speech analyzer 602 may operate in a similar manner as that of speech to video analyzer 502, to identify portions of the video stream that are the same or similar to that of the current portion of the video stream under analysis. For example, in the simple case of the conference participant using the same mouth movements each time he or she utters "sales," video to speech analyzer 602 may identify those other portions of the video. In turn, video to speech analyzer 602 may leverage AV speech model 604 (e.g., as generated by AV modeler 410), to identify the portions of the audio stream that were co-presented with these portions of video or are otherwise associated with these portions of video.

Audio extrapolation engine 416 may also include a predictive audio model 606 that models the various portions of the audio stream that were co-presented with the portions of video that are related to the current portion of video under analysis. Similar to predictive video model 506, predictive audio model 606 may model the common audio features across the different portions of audio identified from AV speech model 604, to predict the next portion of audio in the stream.

Based on the audio features predicted by predictive audio model 606, audio generator 608 may use these audio features to generate the audio output data to be used in lieu of the missing portion of the audio stream. In some embodiments, predictive audio model 606 can also leverage signal processing approaches, such as Code-Excited Linear Prediction (CELP), to extrapolate the audio stream over a short period of time (e.g., when the audio delay is below a predefined threshold). However, if the delay is greater than that threshold, audio generator 608 may instead rely on the natural language models of predictive audio model 606, to predict the next phoneme or identify the next likely current phoneme.

Thus, in the reverse case where the video stream is leading the audio, audio extrapolation engine 416 may assess video features, such as mouth movements of a conference participant, to effectively perform lip-reading of the participant. Note that the techniques herein also leverage the previously received portion of the audio stream, to further enhance the actual audio that is output, as opposed to a static lip-reading approach. In addition, unlike pure lip-reading techniques, the techniques herein are also not constrained to only this sole facial feature, but can take into account any number of video features present in the prior portions of the video stream.

Accordingly, the above architectures provide a system that is able to use extrapolation to advance time and mitigate latency in multimedia streams, such as AV streams. This can be achieved by cross-matching across media streams (e.g., across audio and video), in cases in which the stream latencies differ. Using signal processing and/or machine learning, the system can leverage audio and/or video feature models, to perform this cross-matching and extrapolation. Such models can also be more specific, in some implementations, such as natural language models, facial feature models, etc. Finally, by using joint models, such as joint audio-video models, the system is able to further leverage a history of the portions of the two streams that were previously co-presented with one another, allowing the system to effectively learn what audio or video should come next, over the course of use.

Figure 7:
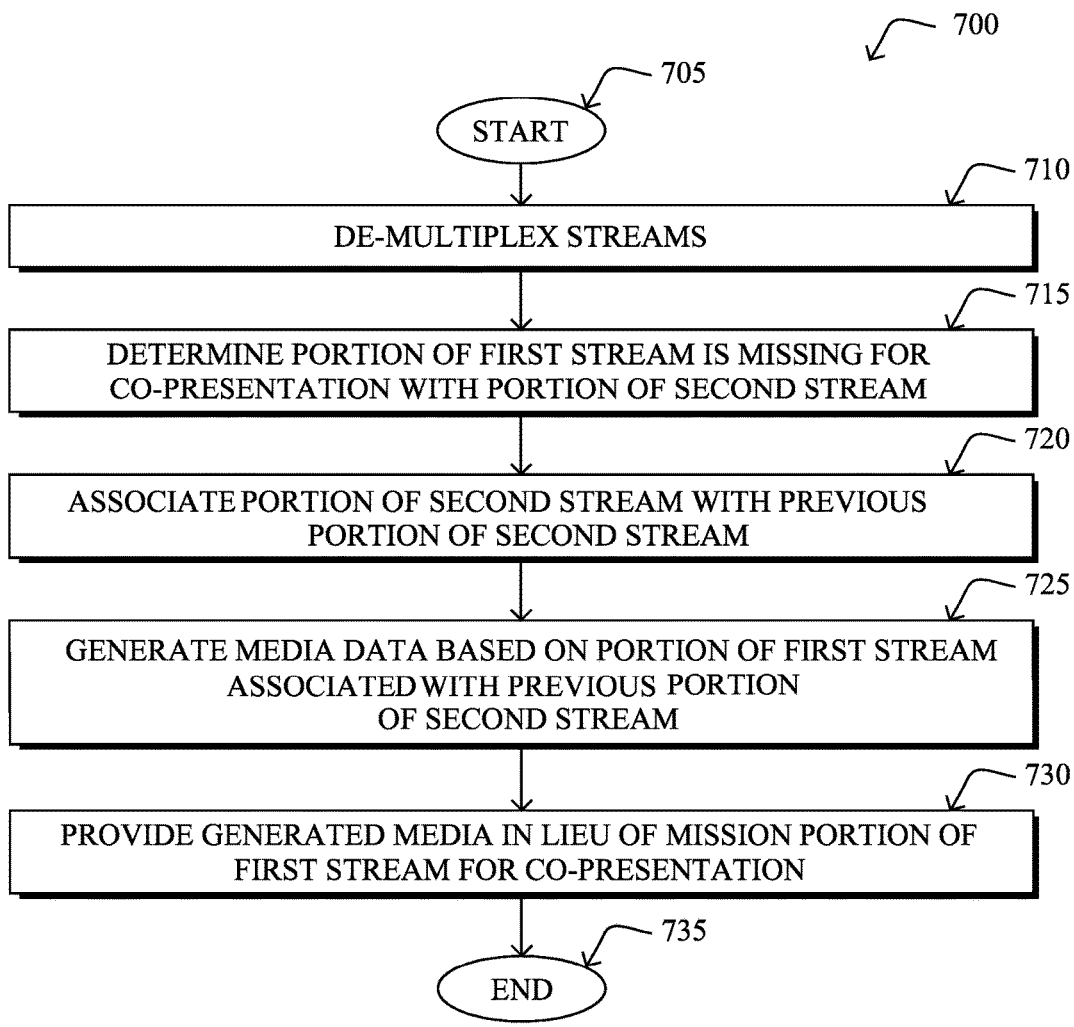
FIG. 7 illustrates an example simplified procedure for processing received multimedia data in the presence of latency.

FIG. 7 illustrates an example simplified procedure for processing received multimedia data in the presence of latency, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may de-multiplex a stream of multimedia data into first and second streams of media data. For example, in the case of AV data, the device may de-multiplex the AV stream into an audio stream and video stream, accordingly.

At step 715, as detailed above, the device may determine that a portion of the first media stream is missing for co-presentation with a corresponding portion of the second media stream due to a present latency condition. For example, in the case of the multimedia stream comprising audio and video streams, the audio for the current portion of video for presentation may be missing due to latency or vice-versa.

At step 720, the device may associate the corresponding portion of the second media stream with a previously received portion of the second media stream, according to various embodiments. The previously received portion of the For example, in the case of an uttered word, sound, phoneme, etc., the device may identify the previous utterances of that word, sound, phoneme, etc. Similarly, in the case of a video, the portions of video may be associated based on similar video features (e.g., pixels, motions, facial features of a person, etc.).

At step 725, as detailed above, the device may generate media data for the first media stream for co-presentation with the corresponding portion of the second media stream. This generated media data may be used in lieu of the missing portion of the first media stream and be based on a previously received portion of the first media stream that was co-timed with the previously received portion of the second media stream. For example, machine learning models can be used to extrapolate out a video stream and/or audio stream, to generate the next predicted portion of audio or video to be co-presented.

At step 730, the device may provide the generated media data and the corresponding portion of the second media stream for co-presentation by one or more user interfaces, as described in greater detail above. For example, if the audio stream is experiencing latency, the generated portion of the audio may be sent to a speaker for co-presentation with the portion of video that was not delayed. The process is also able to handle the reverse situation, whereby missing video can be displayed with audio that is not experiencing any latency. When the latency of either or both streams is below one or more thresholds, the system may further simply provide those portions of the streams for presentation by the user interface(s), meaning that the generated media data is only presented in cases where the latency exceeds a certain threshold. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, will mitigate the effects of latency, regardless of its actual cause. In some aspects, the techniques leverage information in audio streams to more effectively reduce latency in video streams and vice-versa, and potentially making use of more specific models (e.g., facial models, language models, etc.), when possible. By being implemented in endpoint receivers, the techniques also allow for adjustments to be made to the transmission methods and encoding techniques (e.g., FEC), which have to meet multiple other constraints.

While there have been shown and described illustrative embodiments that provide for latency mitigation in a multimedia system, it is to be understood that various other adaptations and modifications may be made within the spirit and scope of the embodiments herein. For example, while certain embodiments are described herein with respect to using certain models for purposes of modeling audio, video, and the relationships between audio and video, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   de-multiplexing, by a device in a network, a stream of multimedia data into first and second media streams, wherein the first media stream is a video stream and the second media stream is an audio stream;
   determining, by the device, that a portion of the first media stream is missing for co-presentation with a corresponding portion of the second media stream due to a present latency condition;
   associating, by the device, the corresponding portion of the second media stream with a previously received portion of the second media stream;
   generating, by the device, media data for the first media stream for co-presentation with the corresponding portion of the second media stream in lieu of the missing portion of the first media stream, based on a previously received portion of the first media stream associated with the previously received portion of the second media stream, wherein generating includes:
      identifying, by the device, an audio feature from the corresponding portion of the audio stream; and
      matching, by the device, the audio feature to an audio feature from the previously received portion of the audio stream; and
      selecting, by the device, the media data as a portion of the video stream that was co-presented by the one or more user interfaces with the previously received portion of the audio stream; and
   providing, by the device, the generated media data and the corresponding portion of the second media stream for co-presentation by one or more user interfaces.

2. The method as in claim 1, wherein generating the media data comprises:

identifying, by the device, a facial feature depicted in the corresponding portion of the video stream for which the portion of the audio stream is missing;

matching, by the device, the facial feature to a facial feature depicted in the previously received portion of the video stream; and selecting, by the device, the media data as a portion of the audio stream that was co-presented by the one or more user interfaces with the previously received portion of the video stream.

3. The method as in claim 1, wherein generating the media data further comprises:

using, by the device, a machine learning model to extrapolate the audio stream based on one or more portion of the audio stream that were previously received by the one or more user interfaces.

4. The method as in claim 1, further comprising:

using, by the device, a machine learning model trained to identify relationships between audio and video streams to identify the previously received portion of the first media stream associated with the previously received portion of the second media stream.

5. The method as in claim 1, wherein the audio feature comprises a spoken phoneme, and wherein media data comprises a facial feature.

6. The method as in claim 1, wherein generating the media data further comprises:

using, by the device, a machine learning model to extrapolate the video stream based on one or more portion of the video stream that were previously received by the one or more user interfaces.

7. The method as in claim 1, further comprising:

providing, by the device, portions of the first media stream with corresponding portions of the second media stream for co-presentation by one or more user interfaces, when the latency condition is not present.

8. An apparatus comprising:

one or more network interfaces to communicate with a network;

a processor coupled to the network interfaces and configured to execute one or more processes; and a memory configured to store a process executable by the processor, the process when executed configured to:

de-multiplexing a stream of multimedia data into first and second media streams, wherein the first media stream is a video stream and the second media stream is an audio stream;

determine that a portion of the first media stream is missing for co-presentation with a corresponding portion of the second media stream due to a present latency condition;

associate the corresponding portion of the second media stream with a previously received portion of the second media stream;

generate media data for the first media stream for co-presentation with the corresponding portion of the second media stream in lieu of the missing portion of the first media stream, based on a previously received portion of the first media stream associated with the previously received portion of the second media stream, wherein generating includes:

identifying, by the device, an audio feature from the corresponding portion of the audio stream; and matching, by the device, the audio feature to an audio feature from the previously received portion of the audio stream; and selecting, by the device, the media data as a portion of the video stream that was co-presented by the one or more user interfaces with the previously received portion of the audio stream; and provide the generated media data and the corresponding portion of the second media stream for co-presentation by one or more user interfaces.

9. The apparatus as in claim 8, wherein the apparatus generates the media data by:

identifying a facial feature depicted in the corresponding portion of the video stream for which the portion of the audio stream is missing;

matching the facial feature to a facial feature depicted in the previously received portion of the video stream; and selecting the media data as a portion of the audio stream that was co-presented by the one or more user interfaces with the previously received portion of the video stream.

10. The apparatus as in claim 8, wherein the apparatus generates the media data further by:

using a machine learning model to extrapolate the audio stream based on one or more portion of the audio stream that were previously received by the one or more user interfaces.

11. The apparatus as in claim 8, wherein the process when executed is further configured to:

use a machine learning model trained to identify relationships between audio and video streams to identify the previously received portion of the first media stream associated with the previously received portion of the second media stream.

12. The apparatus as in claim 8, wherein the audio feature comprises a spoken phoneme, and wherein media data comprises a facial feature.

13. The apparatus as in claim 8, wherein the apparatus generates the media data further by:

using a machine learning model to extrapolate the video stream based on one or more portion of the video stream that were previously received by the one or more user interfaces.

14. A tangible, non-transitory, computer-readable medium storing program instructions that cause a device in a network to execute a process comprising:

de-multiplexing, by the device in the network, a stream of multimedia data into first and second media streams, wherein the first media stream is a video stream and the second media stream is an audio stream;

determining, by the device, that a portion of the first media stream is missing for co-presentation with a corresponding portion of the second media stream due to a present latency condition;

associating, by the device, the corresponding portion of the second media stream with a previously received portion of the second media stream;

generating, by the device, media data for the first media stream for co-presentation with the corresponding portion of the second media stream in lieu of the missing portion of the first media stream, based on a previously received portion of the first media stream associated with the previously received portion of the second media stream, wherein generating includes:

identifying, by the device, an audio feature from the corresponding portion of the audio stream; and matching, by the device, the audio feature to an audio feature from the previously received portion of the audio stream; and selecting, by the device, the media data as a portion of the video stream that was co-presented by the one or more user interfaces with the previously received portion of the audio stream; and providing, by the device, the generated media data and the corresponding portion of the second media stream for co-presentation by one or more user interfaces.

* * * * *